UNITED STATES PATENT OFFICE.

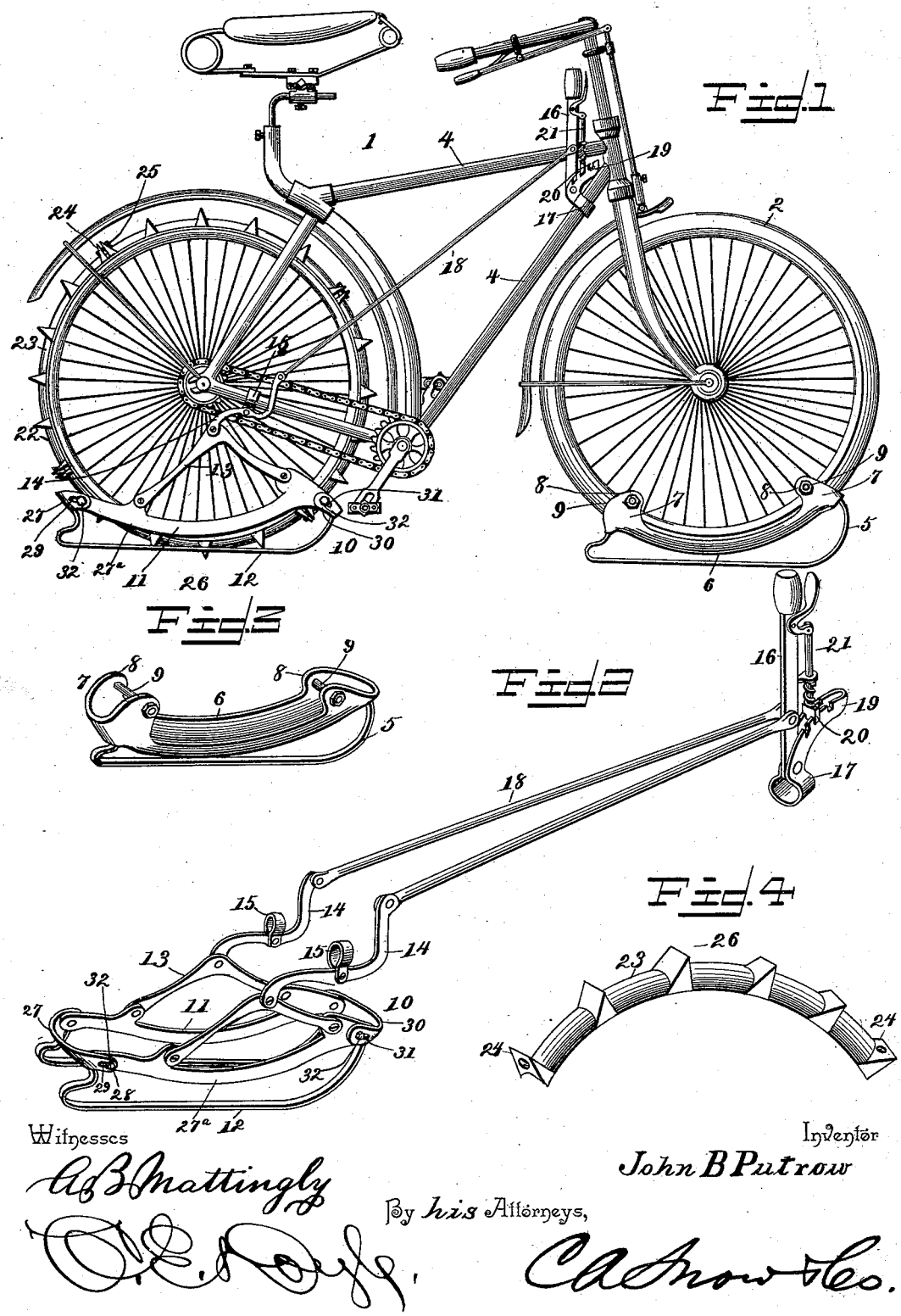

JOHN BAPTIST PUTROW, OF WESTBOROUGH, WISCONSIN, ASSIGNOR OF ONE-HALF TO WILLIAM E. DUNCAN, OF SAME PLACE.

SLEIGH ATTACHMENT FOR BICYCLES.

SPECIFICATION forming part of Letters Patent No. 524,349, dated August 14, 1894.

Application filed March 27, 1893. Renewed July 10, 1894. Serial No. 517,153. (No model.)

*To all whom it may concern:*

Be it known that I, JOHN BAPTIST PUTROW, a citizen of the United States, residing at Westborough, in the county of Taylor and State of Wisconsin, have invented a new and useful Sleigh Attachment for Bicycles, of which the following is a specification.

The object of my invention is to provide a sleigh attachment for bicycles which can be applied to and removed from any safety bicycle of the ordinary construction, without in any way modifying the construction of said machine or detracting from its utility as a wheeled vehicle.

A further object of my invention is to provide adjusting devices whereby the rear runner, or that which is arranged in proximity to the rear or driving-wheel, may be lowered to elevate such driving-wheel, to enable the machine to move without propulsion when descending grades, or may be elevated to lower the driving wheel to an operative position when propulsion is necessary.

Further objects and advantages of my invention will appear in the following description, and the novel features thereof will be particularly pointed out in the appended claims.

In the drawings: Figure 1 is a side view of a bicycle and the sleigh attachment, embodying my invention, applied thereto in the operative position. Fig. 2 is a perspective view of the rear runner and attachments, detached. Fig. 3 is a similar view of the front runner. Fig. 4 is a similar view of one section of the spurred rim for the driving-wheel.

Similar numerals of reference indicate corresponding parts in all the figures of the drawings.

The attachment embodying my invention is illustrated in the drawings as applied to a safety bicycle of an ordinary and well known construction, of which, 1, designates the front or steering-wheel, 2, the rear or driving-wheel, 3, the frame, and 4, a brace forming a part of said frame.

The attachment comprises, essentially, runners for the front and rear wheels of the bicycle, of which the rear wheel runner is adjustably mounted and is provided with adjusting devices whereby it may be elevated and lowered at the will of the operator. The front runner, 5, is fixed firmly to the front wheel by means of a concave shoe, 6, which clasps a portion of the tire of said wheel, and clamps, 7, arranged at opposite ends of said shoe to engage the wheel.

The clamping devices, 7, preferably consist of vertical ears, 8, arranged in pairs at opposite ends of the shoe, 6, and transversely-disposed bolts, 9, which connect said ears and extend over and in contact with the inner surface of the rim of the wheel, between the spokes thereof.

The rear runner, 10, comprises a hollow or skeleton shoe, 11, and duplicate runner-blades, 12, which are attached, respectively, to the opposite, parallel sides of the skeleton shoe. The side-bars of the shoe, 11, are arranged upon opposite sides of the rear or driving-wheel, and the length of the shoe is sufficient to enable it to be elevated so that its runner blades are above the plane of the lowermost point of the driving-wheel.

Brackets, 13, are attached to opposite side-bars of the rear runner and are pivotally connected, at opposite points, to the rear ends of the bell-crank levers, 14. These bell-crank levers are provided, at intermediate points, with loop-shaped clips, 15, which are adapted to engage horizontal bars of the bicycle frame, as clearly shown in Fig. 1. The bell-crank levers are pivotally connected to these clips.

16 represents an adjusting lever, which is pivotally mounted upon a suitable part of the frame of the bicycle within convenient reach of the rider. The connections by which said lever is attached to the frame preferably consist of a clip, 17, embracing the bar or brace, 4, near the head of the machine, and between the free ends of which is pivoted the lower end of the adjusting-lever.

Any suitable connections may be provided between the free, front end of the bell-crank levers, 14, and an intermediate point of the adjusting-lever. In the construction illustrated such connections consist of rods, 18. I have also provided locking-devices, for holding the adjusting lever in any desired position, and forming a part of the "adjusting-devices" above mentioned; such locking-devices comprising a toothed segment, 19, carried by the clip 17, a spring actuated sliding dog, 20, and an operating lever, 21, connected to the upper end of said dog.

The rear or driving wheel is provided with a spurred rim, 22, to engage the ice or snow in propelling the machine, such rim being formed in independent or detachable sections, 23, provided with terminal ears, 24, which are connected by the fastening-bolts, 25. The sections of the rim are provided with interior rounded channels to conform to the surface of the tire of the wheel and provide a protection therefor, and exterior spurs or teeth, 26; the upstanding ears 24, at the joints between the sections of the spurred rim combining to form a spur, as shown, to occupy the interval between the two adjacent spurs of the adjoining sections.

By means of the connections and adjusting devices, above described, the rider, by a proper manipulation of the adjusting lever, may elevate the rear runner to expose the spurred rim of the driving-wheel, or bring the latter in contact with the surface over which the machine is traveling, or may depress said runner to remove the driving-wheel from contact with the surface and cause the machine to travel solely upon runners.

The runner blades 12 of the rear runner 10 are preferably secured to the side-bars 27ª of the shoe 11, and the rear end 27 of the shoe is provided with terminal ears 28 which fit over the rear ends of the side-bars 27ª, and are provided with slots 29 engaged by locking bolts 32. The front end 30 of the shoe is similarly constructed, being provided with ears having slots 31 engaged by locking bolts 31. By this construction the length of the shoe may be adjusted to correspond with the size of the wheel of the vehicle to which the attachment is applied.

Changes in the form, proportion, and minor details of construction may be resorted to without departing from the spirit or sacrificing any of the advantages of my invention.

Having thus described my invention, what I claim, and desire to secure by Letters Patent of the United States, is—

1. In a device of the class described, a fixed front runner, a rear runner having a hollow or skeleton frame the side-bars of which are arranged upon opposite sides of the rear or driving-wheel, a spurred rim attached to said rear or driving-wheel, a bell-crank lever 14 pivotally connected to said rear runner, a stationary toothed segment 19 an adjusting-lever provided with locking devices to engage said segment, and connections between the adjusting and bell-crank levers, substantially as specified.

2. In a device of the class described, a spurred rim comprising detachable segmental sections provided with interior rounded channels to fit the tire of the wheel, exterior spaced spurs, and terminal outstanding ears provided with connecting devices, said ears occupying the intervals between the adjacent spurs of adjoining sections extending radially, and corresponding in length with said spurs, whereby the tips of the ears lie in a circle embracing the terminals of the spurs, substantially as specified.

3. In a device of the class described, the combination of a fixed front runner, a loose rear runner having a shoe comprising side bars, slidable end pieces carried by said side bar, and adjustable connections between said side bars and end pieces, and operating devices for said rear runner, substantially as specified.

In testimony that I claim the foregoing as my own I have hereto affixed my signature in the presence of two witnesses.

JOHN BAPTIST PUTROW.

Witnesses:
JOHN GAMPER,
WM. E. DUNCAN.